United States Patent
Schreiber et al.

(10) Patent No.: US 10,185,559 B2
(45) Date of Patent: Jan. 22, 2019

(54) DOCUMENTATION NOTIFICATION

(71) Applicant: HEWLETT PACKARD ENTERPRISE DEVELOPMENT LP, Houston, TX (US)

(72) Inventors: Daniel Schreiber, Yehud (IL); Shimon Cherny, Yehud (IL); Effi Bar-Shean, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/308,575

(22) PCT Filed: Jun. 25, 2014

(86) PCT No.: PCT/US2014/044065
§ 371 (c)(1),
(2) Date: Nov. 2, 2016

(87) PCT Pub. No.: WO2015/199677
PCT Pub. Date: Dec. 30, 2015

(65) Prior Publication Data
US 2017/0060577 A1     Mar. 2, 2017

(51) Int. Cl.
| G06F 9/44 | (2018.01) |
| G06F 9/45 | (2006.01) |
| G06F 8/73 | (2018.01) |
| G06F 11/36 | (2006.01) |
| G06F 17/30 | (2006.01) |

(52) U.S. Cl.
CPC ............ *G06F 8/73* (2013.01); *G06F 11/3668* (2013.01); *G06F 17/30011* (2013.01); *G06F 17/30368* (2013.01); *G06F 17/30864* (2013.01)

(58) Field of Classification Search
CPC .. G06F 8/73; G06F 11/3668; G06F 17/30011; G06F 17/30368; G06F 17/30364; G06F 17/30311
See application file for complete search history.

(56) References Cited

U.S. PATENT DOCUMENTS

| 5,949,999 | A |  | 9/1999 | Song et al. |
| 5,987,251 | A |  | 11/1999 | Crockett et al. |
| 6,223,343 | B1 |  | 4/2001 | Hopwood et al. |
| 7,503,041 | B2 | * | 3/2009 | Butterweck ............... G06F 8/60 717/168 |
| 7,606,820 | B2 |  | 10/2009 | Stienhans et al. |
| 7,793,258 | B2 |  | 9/2010 | Sundararajan et al. |
| 7,904,885 | B2 | * | 3/2011 | Volkmer ................... G06F 8/71 717/120 |

(Continued)

FOREIGN PATENT DOCUMENTS

WO     2012033511 A1     3/2012

OTHER PUBLICATIONS

Padmalata Nistala, Establish Content Traceability for Software Applications, 2013, pp. 68-71. https://ieeexplore.ieee.org/stamp/stamp.jsp?tp=&arnumber=6620157 (Year: 2013).*

(Continued)

*Primary Examiner* — Mongbao Nguyen (57) ABSTRACT

In one implementation, a record associated with an element of an application is maintained and a notification is generated when the record indicates a lack of documentation.

16 Claims, 5 Drawing Sheets

(56) References Cited

U.S. PATENT DOCUMENTS

| | | | |
|---|---|---|---|
| 8,121,891 B2 | 2/2012 | Handel et al. | |
| 8,307,351 B2* | 11/2012 | Weigert | G06F 21/16 717/131 |
| 8,488,173 B2 | 7/2013 | Klein | |
| 8,489,390 B2 | 7/2013 | Arumugam et al. | |
| 8,495,487 B2 | 7/2013 | Jerome et al. | |
| 8,666,935 B2 | 3/2014 | Evanitsky | |
| 8,874,736 B2* | 10/2014 | Levi | H04L 43/50 370/252 |
| 9,361,076 B1* | 6/2016 | Veliah | G16H 10/60 |
| 2003/0046681 A1* | 3/2003 | Barturen | G06F 8/71 717/177 |
| 2005/0125422 A1* | 6/2005 | Hirst | G06F 17/2725 |
| 2005/0278395 A1* | 12/2005 | Sandaire | G06F 8/60 |
| 2006/0005182 A1* | 1/2006 | Butterweck | G06F 8/60 717/175 |
| 2006/0059457 A1 | 3/2006 | Pandit | |
| 2007/0240116 A1* | 10/2007 | Bangel | G06F 11/3664 717/124 |
| 2008/0072209 A1* | 3/2008 | Farrah | G06F 8/10 717/113 |
| 2008/0091676 A1* | 4/2008 | Zwilling | G06Q 10/06 |
| 2008/0127089 A1* | 5/2008 | Peretz | G06F 8/71 717/122 |
| 2008/0235663 A1* | 9/2008 | Volkmer | G06F 8/71 717/120 |
| 2008/0271012 A1* | 10/2008 | Eykholt | G06F 8/73 717/174 |
| 2010/0017701 A1 | 1/2010 | Bargeron et al. | |
| 2010/0242028 A1* | 9/2010 | Weigert | G06F 21/105 717/131 |
| 2010/0313179 A1* | 12/2010 | Groves | G06F 8/34 717/101 |
| 2011/0022551 A1* | 1/2011 | Dixon | G06F 11/3616 706/12 |
| 2011/0161425 A1 | 6/2011 | Xiao et al. | |
| 2011/0197186 A1* | 8/2011 | Barker | G06F 17/30722 717/168 |
| 2012/0102458 A1* | 4/2012 | Meijer | G06F 8/73 717/123 |
| 2012/0284617 A1 | 11/2012 | Nouard et al. | |
| 2013/0013998 A1 | 1/2013 | Eykholt | |
| 2013/0091491 A1 | 4/2013 | Koutyrine et al. | |
| 2013/0166521 A1* | 6/2013 | Ghatty | G06F 11/1469 707/695 |
| 2013/0185701 A1* | 7/2013 | Martick | G06F 8/71 717/120 |
| 2013/0282892 A1* | 10/2013 | Levi | H04L 43/50 709/224 |
| 2014/0053125 A1* | 2/2014 | DeLuca | G06Q 10/06398 717/101 |
| 2014/0173562 A1* | 6/2014 | Rothley | G06F 8/73 717/123 |
| 2014/0223416 A1* | 8/2014 | Cohen | G06F 11/3476 717/123 |
| 2015/0143327 A1* | 5/2015 | Holmes | G06F 8/70 717/101 |

OTHER PUBLICATIONS

Jonas Helming, Integrating System Modeling with Project Management—a Case Study, 2009, pp. 571-578. https://ieeexplore.ieee.org/stamp/stamp.jsp?tp=&arnumber=5254210 (Year: 2009).*

Aedah Rahman, The Framework of a Web-Enabled Defect Tracking System, 2004, pp. 690-695. https://ieeexplore.ieee.org/stamp/stamp.jsp?tp=&arnumber=1292958 (Year: 2004).*

Luqi, Documentation Driven Development for Complex Real-Time Systems, 2004, pp. 936-951. https://ieeexplore.ieee.org/stamp/stamp.jsp?tp=&arnumber=1377190 (Year: 2004)*

International Search Report & Written Opinion received in PCT Application No. PCT/US2014/044065, dated Feb. 24, 2015, 12 pages.

Dr. Explain, "A software to create help files, online help manuals, user guides & documentation", downloaded on Jul. 9, 2018, 6 pages. <https://drexplain.com/>.

* cited by examiner

DOCUMENTATION NOTIFICATION

BACKGROUND

Software may be released with documentation, such as a help guide with screenshots. A technical writer can write documentation for an application. For example, documentation can be created by a writer to describe the graphical user interface ("GUI") of an application and the functionality associated with the GUI.

DETAILED DESCRIPTION

In the following description and figures, some example implementations of apparatus, systems, and/or methods of tracking documentation are described. Some examples of tracking documentation are described specifically for use in a continuous delivery methodology. However, it should be noted that examples of a system for tracking documentation described herein may be utilized in a wide variety of systems and suitable environments. In particular, a system and/or method of tracking documentation may provide tracking the documentation of an application based on elements of the application. As used herein, the term "element" refers to an object, a component, a control, a function, a module, and/or other organized portion of application. Furthermore, the term "application" represents any appropriate set of instructions executable by a processor resource. Therefore, a development cycle based on continuous delivery principals is merely one of many potential uses of a system and/or method for tracking documentation. Thus any reference to continuous delivery principles and related subject matter is merely included to provide context for specific examples described herein. The disclosed methods and systems may be applied to other environments and implementations.

In a continuous delivery cycle, development is shorter and updates to an application can be released in a quicker manner relative to traditional software development. Automation can be involved in the continuous development cycle. For example, an application element can be tested automatically upon checking in updated code for the module. Based on the example systems and/or methods described herein, documentation can be managed as a part of the application lifecycle and become part of the automation of the continuous development cycle. The term "documentation," as used herein, means any appropriate written description associated with the element. For example, documentation of an element can include a description of the function of the element and instructions on how to use the element.

Various examples described below relate to providing a notification to document an element of an application based on an identifier associated with the element. By using an identifier with the element, documentation of the element can be tracked and notification of documentation can be autonomously caused to be sent to a writer. Element-by-element organization of documentation allows for creating notifications, such as reports, about which portions of an application (e.g. which elements of the application) can receive documentation as well as avoid recreating documentation for an entire screenshot of elements when an update to the application occurs, such as a visual update to the GUI.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, test, update, and/or modify."

Figure 1:
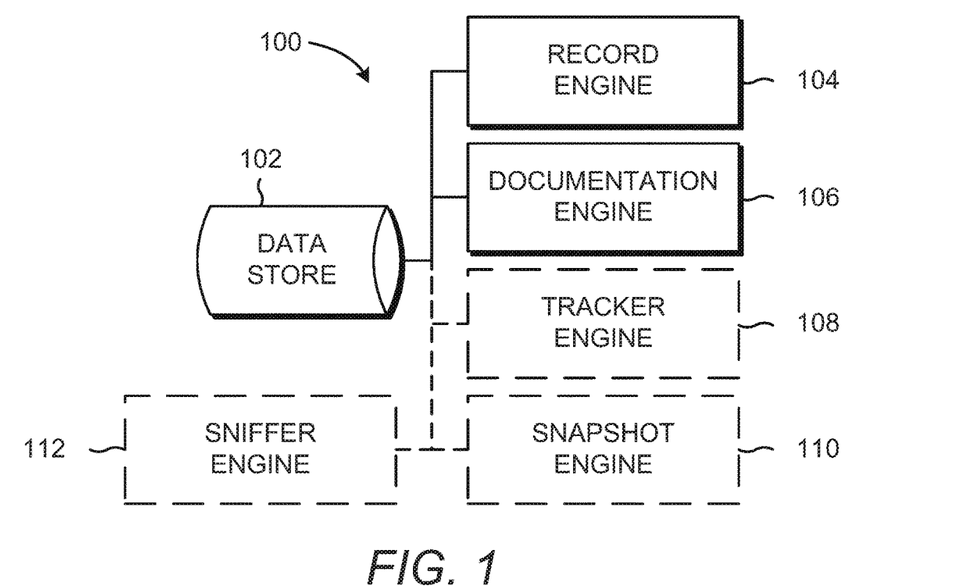
FIGS. 1 and 2 are block diagrams depicting example systems for tracking documentation.
Figure 2:
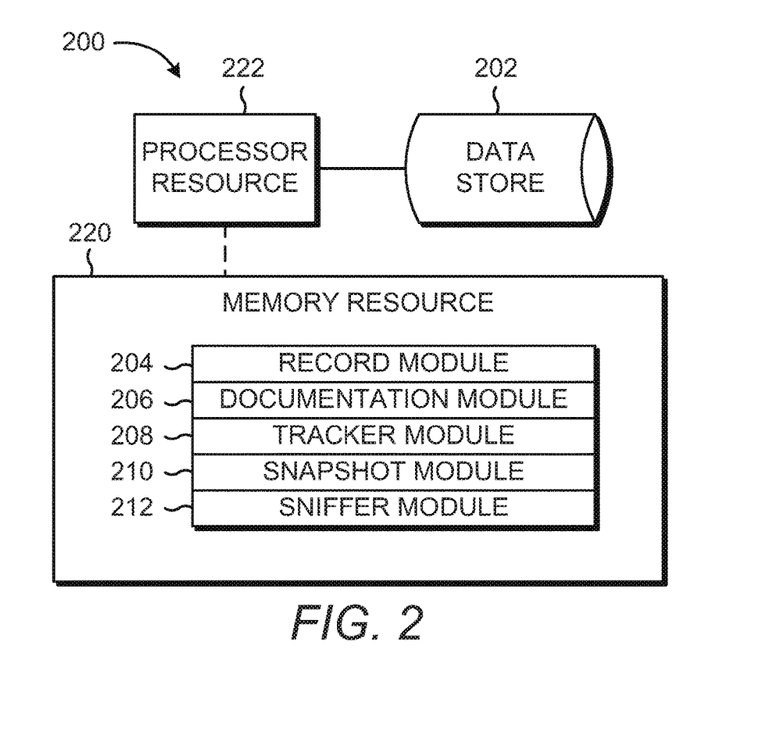

FIGS. 1 and 2 are block diagrams depicting example systems 100 and 200 for tracking documentation. Referring to FIG. 1, the example system 100 of FIG. 1 generally includes a data store 102, a record engine 104, and a documentation engine 106. In general, the documentation engine 106 can provide notification based on the records maintained by the record engine 104. The example system 100 can include a tracker engine 108, a snapshot engine 110, and a sniffer engine 112. The engines 104, 106, 108, 110, and 112 are described in more detail herein.

The record engine 104 represents any combination of circuitry and executable instructions to cause a record associated with an element of an application to be maintained. A record can be a data structure capable of containing information related to the element, such as attributes and properties of the element. For example, the record can contain an identifier associated with documentation of the element. For another example, a record can be a data structure that contains an identifier, a display name of the element, a context of the element, a document object model of the element, and documentation of the element.

The identifier represents any character, number, value, state, label, category, or other attribute to indicate the documentation status of the element. For example, the identifier can be a cardinal number associated with the element that, when exists, indicates the element has been documented. For another example, the identifier can be a string, such as "No_Doc" or a Boolean flag associated with the record of the element to indicate the element needs no documentation. The status of the documentation represents any appropriate state of the documentation, such as undocumented (e.g. no documentation), insufficient documentation, sufficient documentation, or non-documented (e.g. no documentation required for that element class). The context represents the situation of the element. For example, the context of the element can include the page associated with the element. The document object model is a universal convention for representing an object and the attributes of the object. The document object model can include the convention for interacting with the object.

The documentation engine 106 represents any combination of circuitry and executable instructions to generate a notification when the element is maintained and the record indicates a lack of documentation. For example, the documentation engine 106 can search the records maintained by record engine 104 and generate a notification of the documentation status for each record. The documentation engine 106 can analyze a record and, based on the identifier, identify the status of documentation for the element associated with the record. For example, the documentation engine 106 can identify a "Doc_ID" has been added to a record, review whether the record is associated with a string of documentation, and cause a notification to be generated when the status is that the element lacks documentation. For another example, the record engine 104 can include a documentation date variable in the record associated with an element and the documentation engine 106 can determine, based on timestamps, that the element of a particular "Doc_ID" has been modified since the documentation was written for the element based on the documentation date. The documentation engine 106 can be a component of a tracking tool. As used herein, the term "tool" refers to an application utilized to manage the application lifecycle. For example, the documentation engine 106 can search the records of the data store 102 and create tasks to document elements identified by the documentation engine 106 as being deficient in documentation.

A notification can be any transmittable communication to indicate a maintenance action for documentation of an application. The notification can cause at least one of a of a verification instruction to verify documentation of the element and a report instruction to produce a documentation coverage report to identify that the element is missing documentation when the record lacks the identifier. The identifier associated with the record can be used to identify the status of documentation and when a notification is generated. For example, an analysis of the element based on the identifier can indicate that the element is of an element type that should not be documented (e.g. a non-documentation element class). For another example, a lack of identifier in the record can indicate that documentation is missing, deficient, or otherwise lacking and existence of an identifier in the record can indicate there is sufficient documentation.

The tracker engine 108 represents any combination of circuitry and executable instructions to cause the notification to be sent to a tracking tool. The tracker engine 108 can receive an application programming interface ("API") to interact with the tracking tool. The tracking tool can track tasks for execution by an entity, such as a developer or a technical writer. For example, the tracking tool can track documentation tasks that include information regarding what documentation to create. In particular, the tracking tool can track documentation tasks based on an element of the application. Per-element documentation allows for the tracking tool to provide notifications for an element affected by a change to the application.

The notification received by the tracking tool can initiate production of a documentation coverage report. A documentation coverage report identifies the documentation status of elements, such as indicating elements that are missing documentation or otherwise have insufficient documentation (e.g. the documentation should change when the element is modified).

The snapshot engine 110 represents any combination of circuitry and executable instructions to create a snapshot based on the record and cause the snapshot to be sent to the tracking tool. For example, the snapshot engine 110 can create a snapshot associated with an element, store the snapshot in the data store 102 to associate with a record of the element, and pass a copy of (or a reference to) the snapshot to the tracking tool to attach to a task of the tracking tool via the tracker engine 108. In that example, the record engine 104 can maintain element records having a data structure compatible with a snapshot, such as a compressed picture file, to associate the snapshot with an element. The snapshot can be a graphical representation comprising the element. For example, a snapshot can be a screenshot of a window presenting a GUI including the graphical representation of the element.

The sniffer engine 112 represents any combination of circuitry and executable instructions to capture traffic from the application based on a test to execute on the application. The traffic captured by the sniffer engine 112 can be used by the management engine 104 to cause a record to be maintained. For example, the sniffer engine 112 may capture traffic associated with a text box element and the management engine 104 can cause the record associated with the text box element to be maintained based on the traffic captured by the sniffer engine 112. The sniffer engine 112 can be an intermediary between the testing tool and the application under test ("AUT"). For example, the sniffer engine 112 performs a redirect to the application when the testing tool executes a test and redirects application responses to the testing tool.

The sniffer engine 112 can receive a rule for capturing traffic. For example, the sniffer engine 112 can receive a rule (e.g. instructions and/or parameters associated with a testing tool) to capture traffic for tests on the presentation layer of the application and retrieve traffic for elements that do not have a documentation identifier associated with the record of the element. The sniffer engine 112 can send the captured traffic and/or information associated with the captured traffic to the record engine 104 and/or the documentation engine 106. For example, the sniffer engine 112 can send a captured response (e.g. a page of the application) from the test on the GUI of the application to the record engine 104 to maintain the records of the elements (e.g. create a record or update a record) based on the captured traffic.

The data store 102 can contain information utilized by the engines 104, 106, 108, 110, and 112. For example, the data store 102 can store a record of the element, an identifier, a snapshot of an element, and a traffic capture rule.

FIG. 2 depicts the example system 200 for tracking documentation can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a maintenance module 204, a documentation module 206, a tracker module 208, a snapshot module 210, and a sniffer module 212. The processor resource 222 can carry out a set of instructions to execute the modules 204, 206, 208, 210, 212, and/or any other appropriate operations among and/or associated with the modules of the system 200. For example, the processor resource 222 can carry out a set of instructions to maintain a plurality of records associated with a plurality of elements of an application, maintain a plurality of identifiers, identify an undocumented element based on a comparison of the plurality of identifiers and the plurality of records, and generate a notification to maintain documentation of the undocumented element. For another example, the processor resource 222 can carry out a set of instructions to crawl the application for elements, maintain a plurality of records in a database having a document object model, identify an undocumented element in the database, provide a notification to indicate the undocumented element to be documented by a writer, capture a snapshot of the undocumented element based on the document object model, and cause the snapshot to attach to a task of a tracking tool based on a maintenance action associated with the undocumented element. The maintenance module 204, the documentation module 206, the tracker module 208, the snapshot module 210, and the sniffer module 212 represent program instructions that when executed function as the record engine 104, the documentation engine 106, the tracker engine 108, the snapshot engine 110, and the sniffer engine 112 of FIG. 1, respectively.

The processor resource 222 can be any appropriate circuitry capable of processing (e.g. computing) instructions. For example, the processor resource 222 can be a central processing unit ("CPU") that enables tracking documentation by fetching, decoding, and executing modules 204, 206, 208, 210, and 212. Example processor resources 222 include CPUs, semiconductor-based microprocessors, application specific integrated circuits ("ASIC"), a field-programmable gate array ("FPGA"). The processor resource 222 can be one or multiple processing elements capable of retrieving instructions from the memory resource 220 and executing those instructions. Such multiple processing elements can be integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, and 112 of FIG. 1 and the modules 204, 206, 208, 210, and 212 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
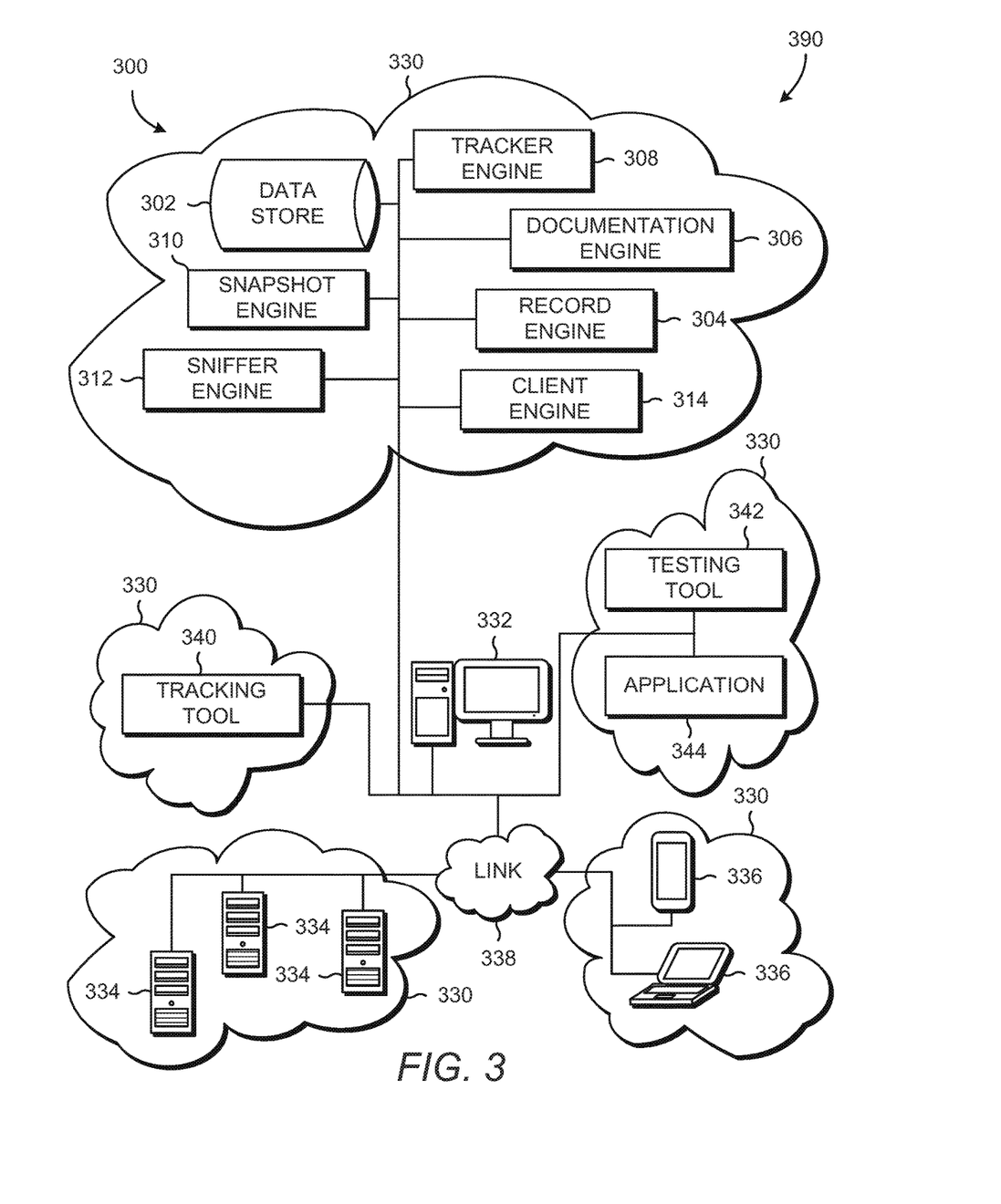
FIG. 3 depicts example environments in which various systems for tracking documentation can be implemented.

FIG. 3 depicts example environments in which various example systems for tracking documentation can be implemented. The example environment 390 is shown to include an example system 300 for tracking documentation. The system 300 (described herein with respect to FIGS. 1 and 2) can represent generally any combination of circuitry and executable instructions to identify an element and provide a notification regarding the documentation status of that element. The system 300 can include a record engine 304, a documentation engine 306, a tracker engine 308, a snapshot engine 310, and a sniffer engine 312 that are the same as the record engine 104, the documentation engine 106, the tracker engine 108, the snapshot engine 110, and the sniffer engine 112 of FIG. 1, respectively, and the associated descriptions are not repeated for brevity. As shown in FIG. 3, the system 300 can include a client engine 314, which is described in detail herein. The engines 304, 306, 308, 310, and 312 can be integrated into a compute device, such as a service device 334. The engines 304, 306, 308, 310, 312, and 314 can be integrated via circuitry or as installed instructions into a memory resource of the compute device.

The example system 300 interacts with a testing tool 342, an application 344, and a tracking tool 340. The testing tool 342 can execute a test via a test script of actions that apply to elements of the application. The tracking tool 340 can maintain a record of bugs (i.e. tasks) associated with the application. A bug is a tracking tool record associated with an element of the application. The bug can comprise a documentation task for the associated element. For example, the tracking tool 340 can track code that needs to be updated by maintaining tasks associated with developers to maintain the code. The example system 300 can interface with the tracking tool and utilize the tracking to track bugs associated with documentation. For example, the system 300 can adapt the use of bugs to notify technical writers of documentation to be created. For another example, the tracking tool can receive notifications from the system 300 to maintain bugs associated with the application.

The client engine 314 represents a combination of circuitry and executable instructions to cause a test to execute on the application. For example, the client engine 314 can initiate a test via a testing tool 342. The client engine 314 can receive an API to interact with the testing tool 342. The client engine 314 can configure the testing tool 342 and the sniffer engine 312. For example, the client engine 314 can provide a capture rule to the sniffer engine 312 and cause the testing tool 342 to execute a test on the application 344 via the sniffer engine 312. The sniffer engine 312 can act as an intermediary between the testing tool 342 and the application 344 under test. For example, the sniffer engine 314 can direct (or redirect) requests, replies, and/or instructions between the testing tool 342 and the application 344. The test can be any appropriate testing of functionality and/or accuracy of the application 344, including a test directed to verification of the existence of documentation. The testing stage of the continuous development cycle is a beneficial point to integrate documentation tracking into the continuous development cycle. The client engine 314 can receive the results of the captured traffic and/or a documentation coverage report.

The documentation coverage report contains a documentation status of an element. For example, the documentation coverage report can indicate an element has no documentation associated with the record of the element and the element is one of an element class that should be documented. The documentation coverage report can list controls that have no documentation identifier and, therefore, are not covered by documentation. The documentation coverage report can include a percentage of the code of the application that is ready for documentation and/or a percentage of code the application that has been documented.

The example environment 390 can include compute devices, such as developer devices 332, service devices 334, and user devices 336. A first set of instructions can be developed and/or modified on a developer device 332. For example, an application can be developed and modified on a developer device 332 and stored onto a web server, such as a service device 334. The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices with an application to communicate a network request and receive and/or process the corresponding responses. For example, a browser application can be installed on a user device 336 to receive the network packet from the service device 334 and utilize the payload of the packet to display an element of the page via the browser application.

The compute devices can be located on separate networks 330 or part of the same network 330. The example environment 390 can include any appropriate number of networks 330 and any number of the networks 330 can include a cloud compute environment. For example, networks 330 can be distributed networks comprising virtual computing resources or "clouds," Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, and 112 of FIG. 1 and/or the modules 204, 206, 208, 210, and 212 of FIG. 2 can be distributed across devices 332, 334, 336, or a combination thereof. The engine and/or modules can complete or assist completion of operations performed in describing another engine and/or module. For example, the documentation engine 306 of FIG. 3 can request, complete, or perform the methods or operations described with the documentation engine 106 of FIG. 1 as well as the record engine 104, the tracker engine 108, the sniffer engine 110, and the sniffer engine 112 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. The engines of the system 300 can perform example methods described in connection with FIGS. 4-7.

Figure 4:
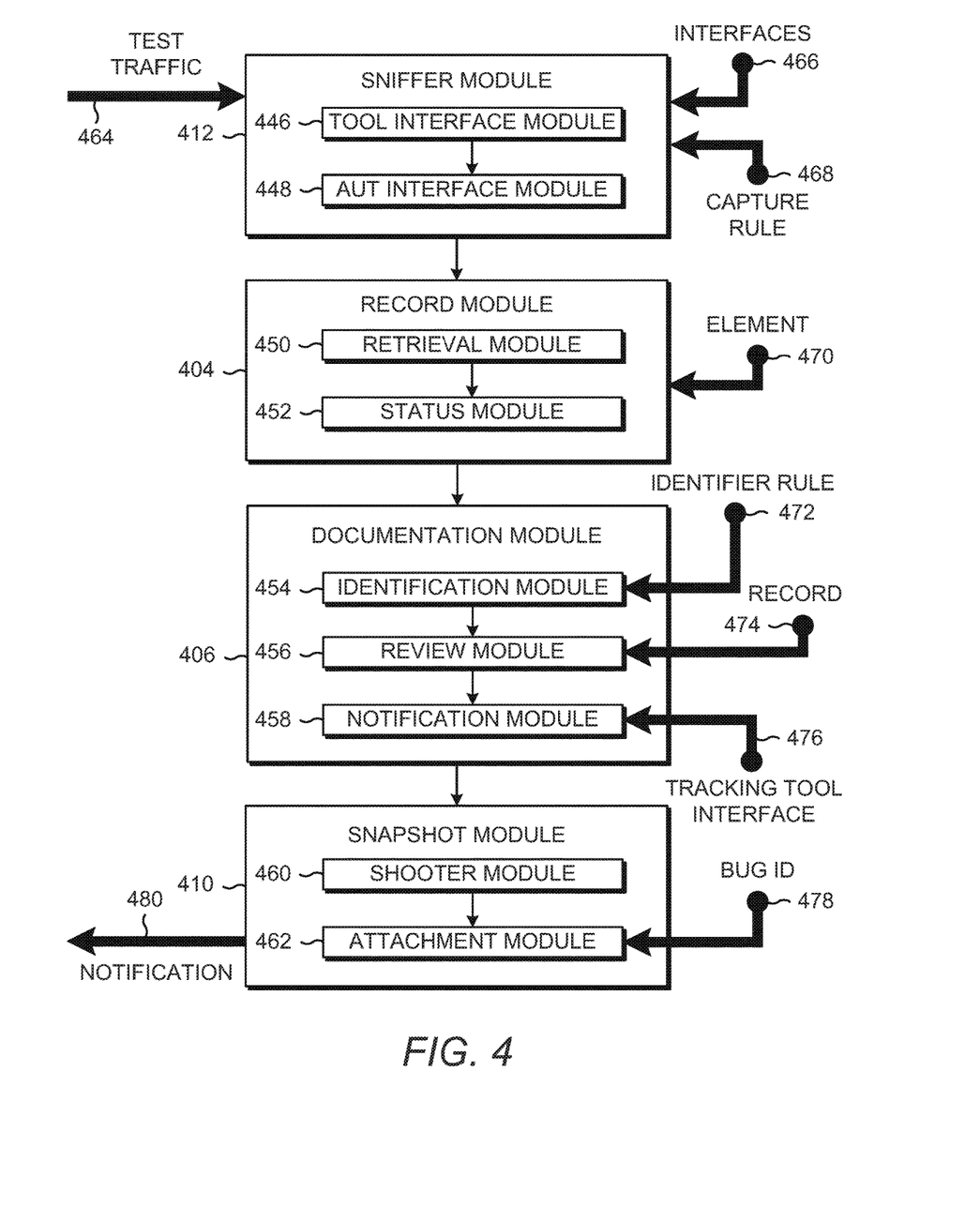
FIG. 4 depicts example modules used to implement example systems for tracking documentation.

FIG. 4 depicts example modules used to implement example systems for tracking documentation. Referring to FIG. 4, the example modules of FIG. 4 generally include a sniffer module 412, a maintenance module 404, a documentation module 406, and a snapshot module 410 that can be the same as the sniffer module 212, maintenance module 204, the documentation module 206, and the snapshot module 210 of FIG. 2, respectively, and the associated descriptions are not repeated for brevity. The example modules of FIG. 4 can be implemented on a service device, such as example service device 334 of FIG. 3.

The sniffer module 412 can include a tool interface module 446 and an AUT interface module 448 that represent program instructions to communicate with a testing tool and an application, respectively. The sniffer module 412 can receive interfaces 466, such as APIs, to communicate with the testing tool and the AUT. The sniffer module 412 can receive a capture rule 468 to configure the sniffer module 412 based on the capture rule 468. The capture rule 468 can indicate the type of test functions, results, and/or other instructions identified by the sniffer module 412 to capture.

An element 470 of the captured traffic can be identified and used by the maintenance module 404 to maintain a record of a database. The retrieval module 450 represents program instructions to identify and/or retrieve a record based on the element 470 and/or traffic captured by the sniffer module 412. The status module 452 represents program instructions to identify and/or update the status of the record of element 470. For example, based on the test traffic 464, the documentation of the record associated with element 470 may be removed and updated with new documentation due to an update of the element 470.

The documentation module 406 can include an identification module 454, a review module 456, and a notification module 458. The identification module 454 represents program instructions to identify a record of the database based on an association of an identifier with an element 470. For example, identification module 454 can identify an undocumented element based on the comparison of the list of identifiers and the plurality of records of a database. The identification module 454 can receive an identifier rule 472 to identify a record 474 that matches the condition of the identifier rule 472. An identifier rule 472 can be any appropriate rule to identify an element record 474 based on the identifier of the record 474. For example, the identifier rule 472 can be a rule to search the database for a record without a documentation identifier or to search the database for a record with a particular documentation identifier. For another example, the identifier rule 472 can represent an instruction to search the database for a record with a documentation identifier and no documentation associated with the record. For yet another example, the identifier rule 472 can be an instruction to identify a particular element or a specific class of elements based on their document object module.

The review module 456 represents program instructions to review a record 474 of the database. The record 474 can be reviewed for the documentation status of the record. For example, the identifier of the record 474 and the documentation of the record 474 can be identified by the review module 456 and the review module 456 can produce a status to indicate the element can be documented and a technical writer may be assigned. For another example, the record 474 can be reviewed based on the identifier rule 472 and indicate documentation can be assigned for revising or otherwise updating the documentation. The review module 456 can use the properties of the element and/or information of the associated record (such as the document object model and the data structure reserved to hold the documentation) to identify whether the element should be documented and assigned to a writer. The notification module 458 represents program instructions to produce a notification 480. For example, the notification module 458 can produce a notification 480 to indicate the documentation status of the element 470 and send the notification 480 to a tracking tool via a tracking tool interface 476. For another example, the notification module 458 can produce a documentation coverage report as a notification 480 to a user of which objects (or the percentage of objects) that are documented and/or are undocumented.

In the example system of FIG. 4, the snapshot module 410 can provide a snapshot with the notification 480 to the tracking tool. The snapshot module 410 can include a shooter module 460 and an attachment module 462. The shooter module 460 can produce a graphical representation, such as a screenshot, comprising the element 470. The attachment module 462 represents program instructions to associate the snapshot produced by the shooter module 460 with a bug of the tracking tool. For example, the attachment module 462 can prepare a request to attach a picture file containing a screenshot of the GUI associated with the element to a bug identification ("bug ID") 478. Then when a user receives a task notification, such as caused by notification 480, the user can receive a graphical representation of the element 470 to assist in the documentation (e.g. a description of where the element 470 is located on the GUI.).

Figure 5:
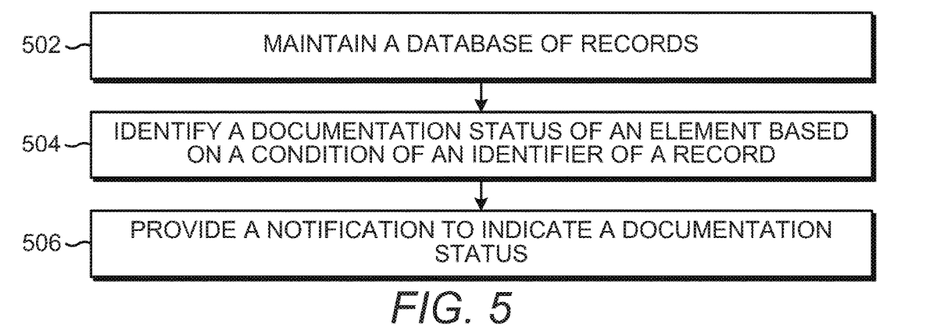
FIGS. 5-7 are flow diagrams depicting example methods of tracking documentation.
Figure 6:
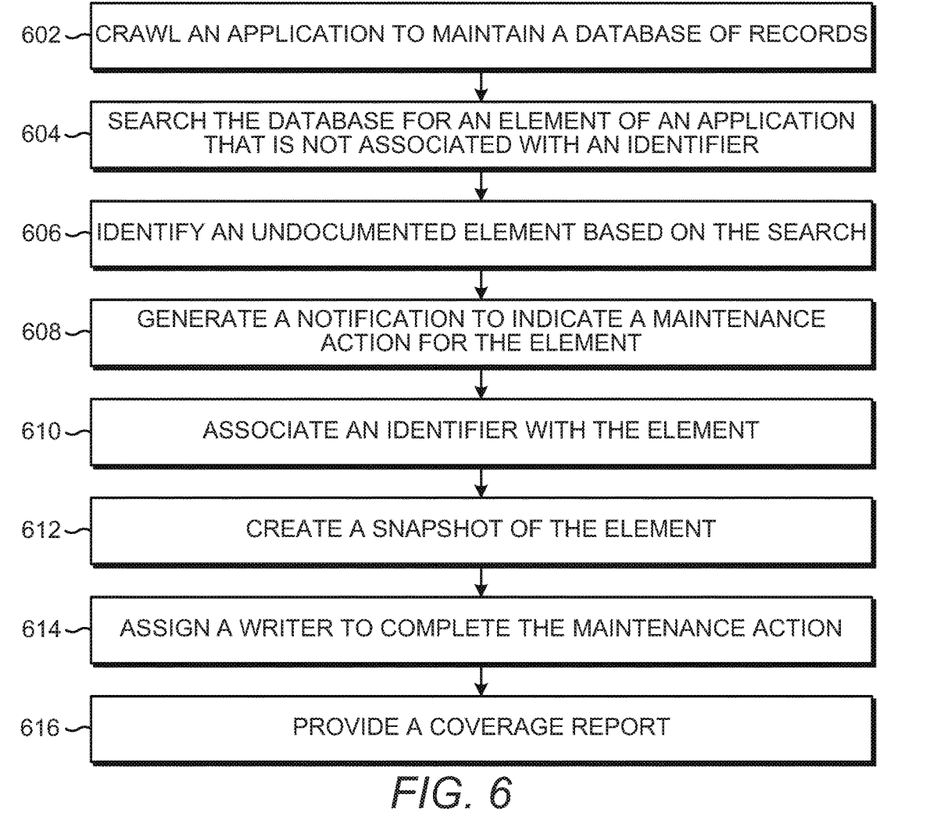

FIGS. 5 and 6 are flow diagrams depicting example methods for tracking documentation. Referring to FIG. 5, example methods for tracking documentation can generally comprise maintaining a database of records, comparing a list of elements of an application to the database, and providing a notification to indicate a documentation status.

At block 502, a database of records is maintained. For example, a record can be maintained by adding an identifier to a record of an element that should be documented, such as based on the class of element or the location of the element (e.g. the presentation layer.) Each record of the plurality of records of the database can be associated with an element of an application. At block 504, a documentation status of an element is identified based on a condition of an identifier of a record associated with the element. The condition of the identifier can include the existence or lack of identifier and the type of identifier. For example, an element without an identifier can be designated for documentation creation and an element with an identifier can be designated as documented. The identification at block 504 can include a determination based on other attributes and parameters associated with the record, such as the element class, the element context, and whether there is documentation in the record associated with the element.

The identification at block 504 can comprise searching the database based on a rule associated with an identifier. The lack of an identifier can indicate an assignment for documentation may be appropriate and the existence of an identifier can indicate one of that the record includes documentation for the element and that the element is associated with an undocumented element class. Thus, a record without an identifier can indicate that the element associated with the record lacks documentation and should be assigned to a technical writer to create the documentation. At block 506, a notification is provided to indicate a documentation status of the element based on the comparison at block 504.

FIG. 6 includes blocks similar to blocks of FIG. 5 and provides additional blocks and details. In particular, FIG. 6 depicts additional blocks and details generally regarding crawling the application, searching a database, identifying an undocumented element, generating a notification, associating an identifier with an element, creating a snapshot, and providing a documentation coverage report.

At block 602, a database of records is maintained by crawling the application to identify the elements of application. For example, the database of records can be updated with a record of an element that has been added to the GUI in a recent development cycle (e.g. the modified code is checked in to a version control system and initiates a test). At block 604, the database is searched for an element of the application that is not associated with an identifier. At block 606, an undocumented element is identified based on the search. For example, a list of records without identifiers can be produced based on the search of records in the database. At block 608, a notification to indicate a maintenance action for the element is generated. For example, the maintenance action can be to create a record and/or documentation for an element that is identified as undocumented. For another example, an element may be flagged as updated and the maintenance action can be to review the current documentation for the element and update the associated documentation with the changes to the element.

At block 610, an identifier is associated with an element. The identifier can be associated when the notification is generated and/or once the documentation is maintained according to the maintenance action. A snapshot can be created and added to a bug of a tracking tool system at block 612. The snapshot can be used as a reference for creating documentation. A writer is assigned to complete the maintenance action (e.g. create documentation for an element when the documentation status indicates a deficiency of documentation of the element) at block 614. At block 616, a documentation coverage report can be provided to a user to show the documentation status of the element and/or how much of the application has been documented.

Figure 7:
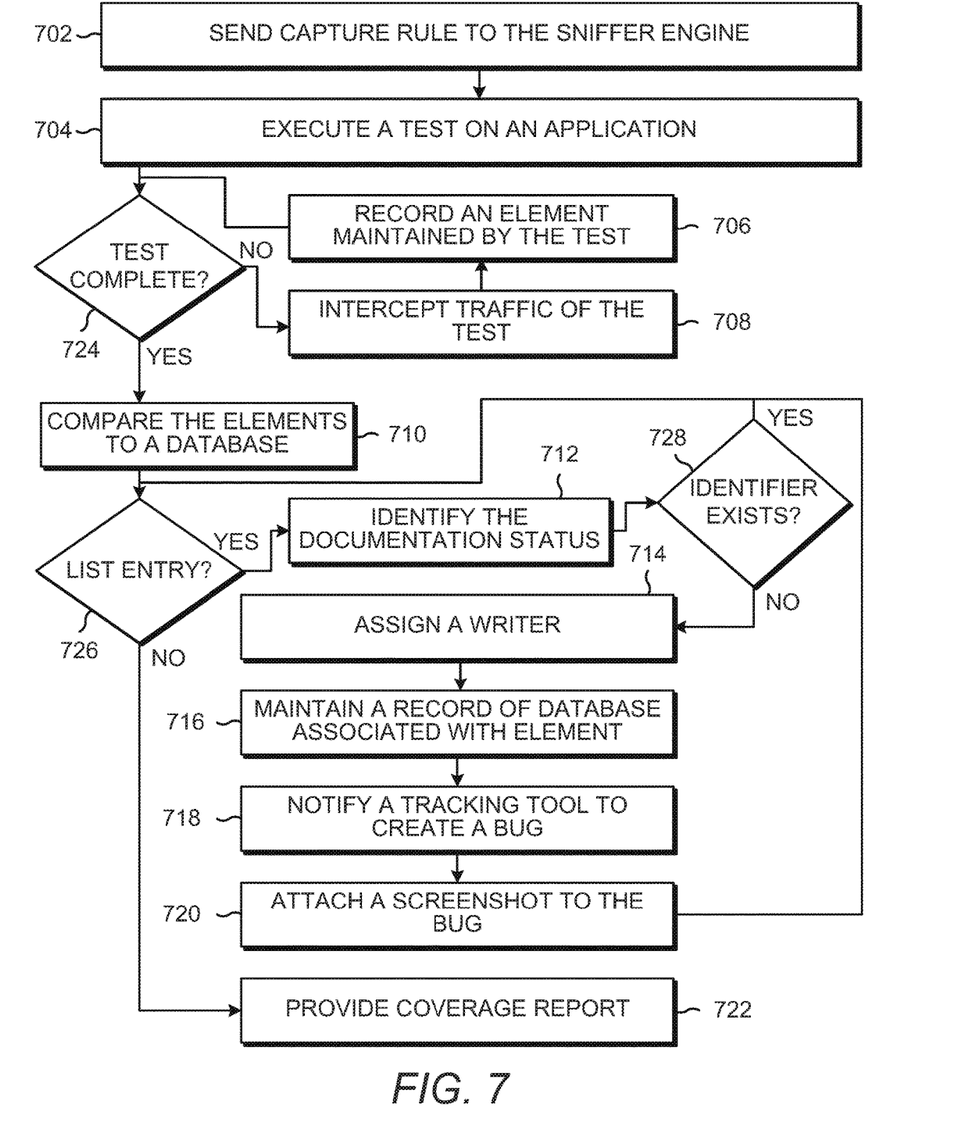

FIG. 7 includes blocks similar to blocks of FIGS. 5 and 6 and provides additional blocks and details. FIG. 7 is an example method of tracking documentation in a testing environment.

At block 702, a capture rule is sent to the sniffer engine, such as sniffer engine 112 of FIG. 1, For example, prior to initiating a test, a tracking system can be configured with the rule for capturing traffic during the test. Once the sniffer engine is configured, the test is executed on the application at block 704. Until the test is complete (as verified at block 724), traffic of the test is intercepted at block 708 and an element maintained by the test is record at block 706. For example, a sniffer engine can receive traffic between the testing tool and the AUT based on the test executed on the application and record information (e.g. pages of the application) into a database for records of the elements of the AUT when the received traffic indicates an element is maintained by the test. Once the test completes, the elements of the application are compared to the database at block 710. For example, the elements of an application can be placed in a list.

For every list entry (verified at block 726) the record is retrieved and the documentation status of the element is identified at block 712. The record is a data structure with a placeholder for a documentation identifier. If the identifier exists at block 728, documentation associated with the element may exist and the identifier can be provided and/or aggregated to the coverage report. If the identifier does not exist at block 728, documentation may be lacking for that element. In another example not shown, the lack of an identifier can indicate the element should be reviewed to determine whether documentation should be created for the element.

A writer is assigned to perform the maintenance action at 714. At block 716, the record of database is maintained based on the maintenance action associated with the element. For example, the documentation can be created or updated as indicated by the documentation status at block 712. For another example, responsive to assigning the element for documentation at block 714, an identifier can be added to the record associated with the element to indicate the documentation has been assigned to a writer. A notification is sent to a tracking tool at block 718. The tracking tool can be notified of maintenance of the element based on captured traffic of the test. The notification can cause the tracking tool to maintain (e.g. create or update) a bug to track the task of providing documentation for the element. At block 720, a screenshot is attached to the bug for retrieval by the assigned writer when creating the documentation. For example, a snapshot engine, such as snapshot engine 110, can create a screenshot based on a document object model associated with the element and provide the screenshot to the tracking tool to associate the screenshot with the bug via an attachment functionality of the tracking tool.

Once the documentation status of each element of the application is verified, a coverage report is provided at block 722 based on the records of the database. For example, the coverage report can indicate an element of the list of elements lacks documentation when the element is not associated with an identifier. For example, the coverage report can provide the percentage of the application that continues to have a lack of documentation. The coverage report can list all the elements of an application that do not include a documentation identifier in the record associated with the element. The coverage report can be produced based on one of a schedule, a continuous development cycle, a test stage, and a modification to the application.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims.

What is claimed is:

1. A method of tracking documentation comprising:
   maintaining, by a processor of a computing device, a plurality of records of a plurality of elements of an application in a database, wherein each of the records contains information related to one of the elements and an identifier indicating a status of documentation of the element;
   receiving a list of the elements of the application;
   analyzing, by the processor, the records of the elements listed in the list to identify a first identifier of a first record having a status that indicates a lack of documentation of a first element;
   based on the status that indicates the lack of documentation of the first element, providing, by the processor, a notification to a tracking tool to cause the tracking tool to document the first element and create a bug based on the first element;
   changing, by the processor, the status of documentation in the first identifier of the first record;
   cause the bug of the tracking tool to be maintained based on the notification, the bug being a tracking tool record associated with a documentation task for the first element associated with the notification;
   create a screenshot based on a document object model associated with the first element; and
   provide the screenshot to the tracking tool to associate the screenshot with the bug via an attachment functionality of the tracking tool.

2. The method of claim 1, comprising:
   providing a coverage report based on the plurality of records in the database, the coverage report to indicate the first element lacks documentation.

3. The method of claim 2, wherein the coverage report is provided based on one of a schedule, a continuous development cycle, a test stage, and a modification to the application.

4. The method of claim 1, further comprising:
   searching the database to determine that the first identifier of the first record indicates that the first element is associated with an undocumented element class.

5. The method of claim 1, comprising:
   receiving traffic based on an execution of the application;
   recording information of the first element when the first element is maintained; and
   notifying the tracking tool of maintenance of the element to create the bug.

6. The method of claim 1, further comprising:
   when one of the elements listed in the list is undocumented and not found in the records, adding an identifier associated with the undocumented element to the records and assigning the undocumented element for a documentation creation.

7. A system comprising:
   a processor; and
   a memory storing instructions that when executed cause the processor to:
     maintain records of elements of an application, wherein each of the records contains information related to one of the elements and an identifier indicating a status of documentation of the element;
     receive a list of the elements of the application;
     analyze the records of the elements listed in the list to identify a first identifier of a first record having a status that indicates a lack of documentation of a first element;
     generate, based on the status that indicates the lack of documentation of the first element, a notification to a tracking tool to cause the tracking tool to document the first element of the application and create a bug based on the first element;
     change the status of documentation in the first identifier of the first record;
     cause the bug of the tracking tool to be maintained based on the notification, the bug being a tracking tool record associated with a documentation task for the first element associated with the notification;

create a screenshot based on a document object model associated with the first element; and
provide the screenshot to the tracking tool to associate the screenshot with the bug via an attachment functionality of the tracking tool.

8. The system of claim 7, wherein the notification causes at least one of a verification instruction to verify documentation of the first element and a report instruction to produce a documentation coverage report to identify that the first element is missing documentation.

9. The system of claim 7, wherein the instructions are to cause the processor to:
execute a test on the application via a testing tool; and
capture traffic from the application based on a rule for capturing the traffic,
wherein the records associated with the elements of the application are maintained based on the captured traffic.

10. The system of claim 7, wherein each of the records of the elements comprises a data structure to contain the identifier, a display name of the element, a context of the element, a document object model of the element, and documentation of the element.

11. The system of claim 7, wherein the instructions are to cause the processor to:
attach the snapshot of the first element to the documentation task of the tracking tool to cause the tracking tool to document the first element of the application.

12. The system of claim 7, wherein the instructions to cause the processor to:
when one of the elements listed in the list is undocumented and not found in the records, add an identifier associated with the undocumented element to the records and assign the undocumented element for a documentation creation.

13. A non-transitory computer readable storage medium comprising a set of instructions that when executed causes a processor resource to:
maintain a plurality of records of a plurality of elements of an application, wherein each of the records contains information related to one of the elements and an identifier indicating a status of documentation of the element;
receive a list of the elements of the application;
analyze the records of the elements listed in the list to identify a first identifier of a first record having a status that indicates a lack of documentation of a first element;
based on the status that indicates the lack of documentation of the first element, generate a notification to a tracking tool to cause the tracking tool to document the first element and create a bug based on the first element;
change the status of documentation in the first identifier of the first record;
cause the bug of the tracking tool to be maintained based on the notification, the bug being a tracking tool record associated with a documentation task for the first element associated with the notification;
create a screenshot based on a document object model associated with the first element and
provide the screenshot to the tracking tool to associate the screenshot with the bug via an attachment functionality of the tracking tool.

14. The medium of claim 13, wherein the set of instructions is to cause the processor resource to:
when one of the elements listed in the list is undocumented and not found in the records, add an identifier associated with the undocumented element to the records and assign the undocumented element for documentation creation; and
when one of the elements listed in the list is found in the records and the record associated with the element has a status that indicates a lack of documentation, assign a writer to maintain the documentation and generate the notification to the tracking tool.

15. The medium of claim 13, wherein the set of instructions is to cause the processor resource to:
crawl the application to obtain the elements; and
maintain the plurality of records of the elements in a database, each of the plurality of records to include a document object model.

16. The medium of claim 15, wherein the set of instructions is to cause the processor resource to:
cause the snapshot to attach to the documentation task of the tracking tool, the documentation task to be a maintenance action associated with the first element.

* * * * *